Jan. 23, 1951  H. M. COX  2,539,010
AIRCRAFT PROPELLING DEVICE
Filed July 9, 1946  3 Sheets-Sheet 1
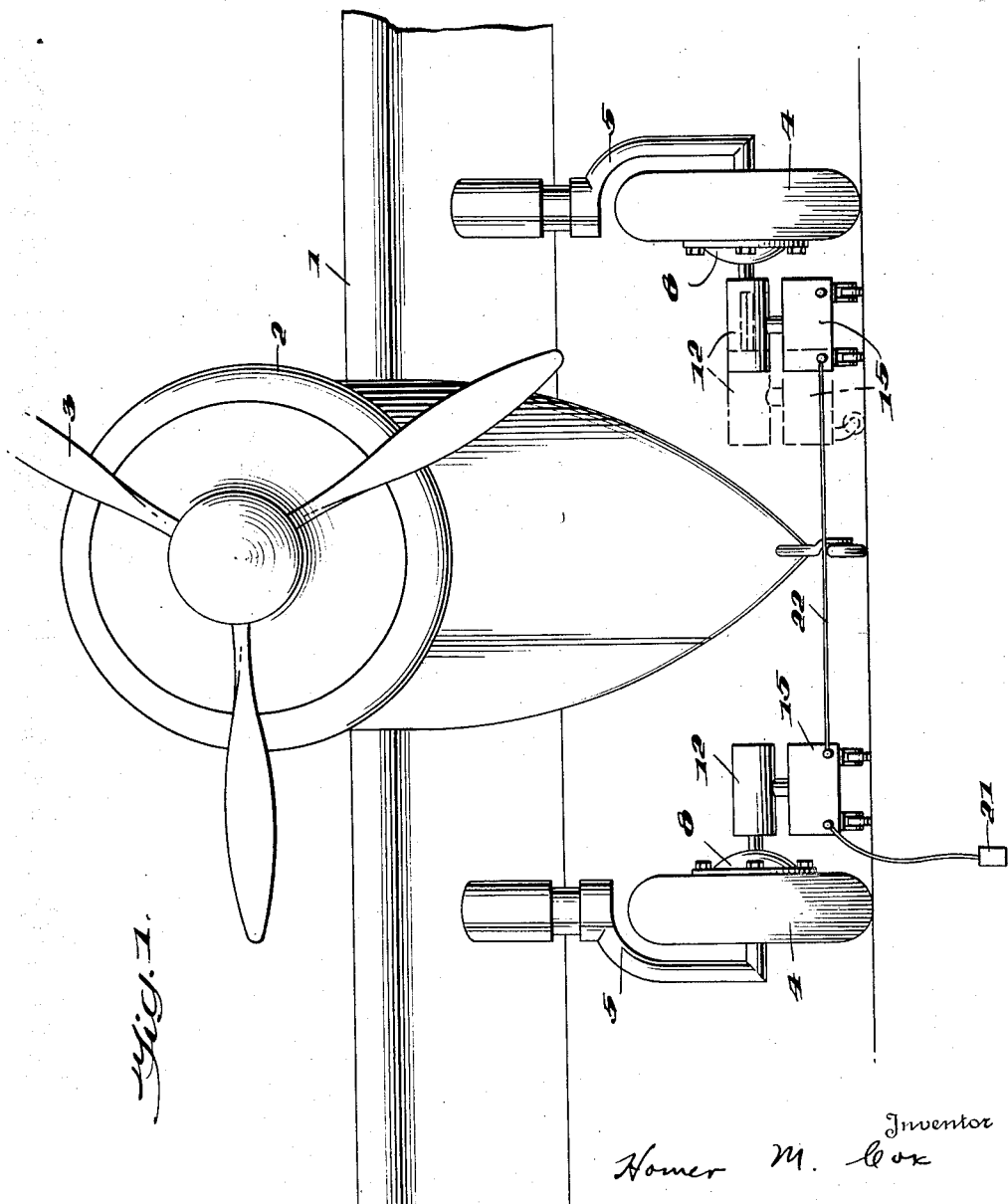
Inventor
Homer M. Cox
By Cyrus Kehr & Snecker
his Attorneys

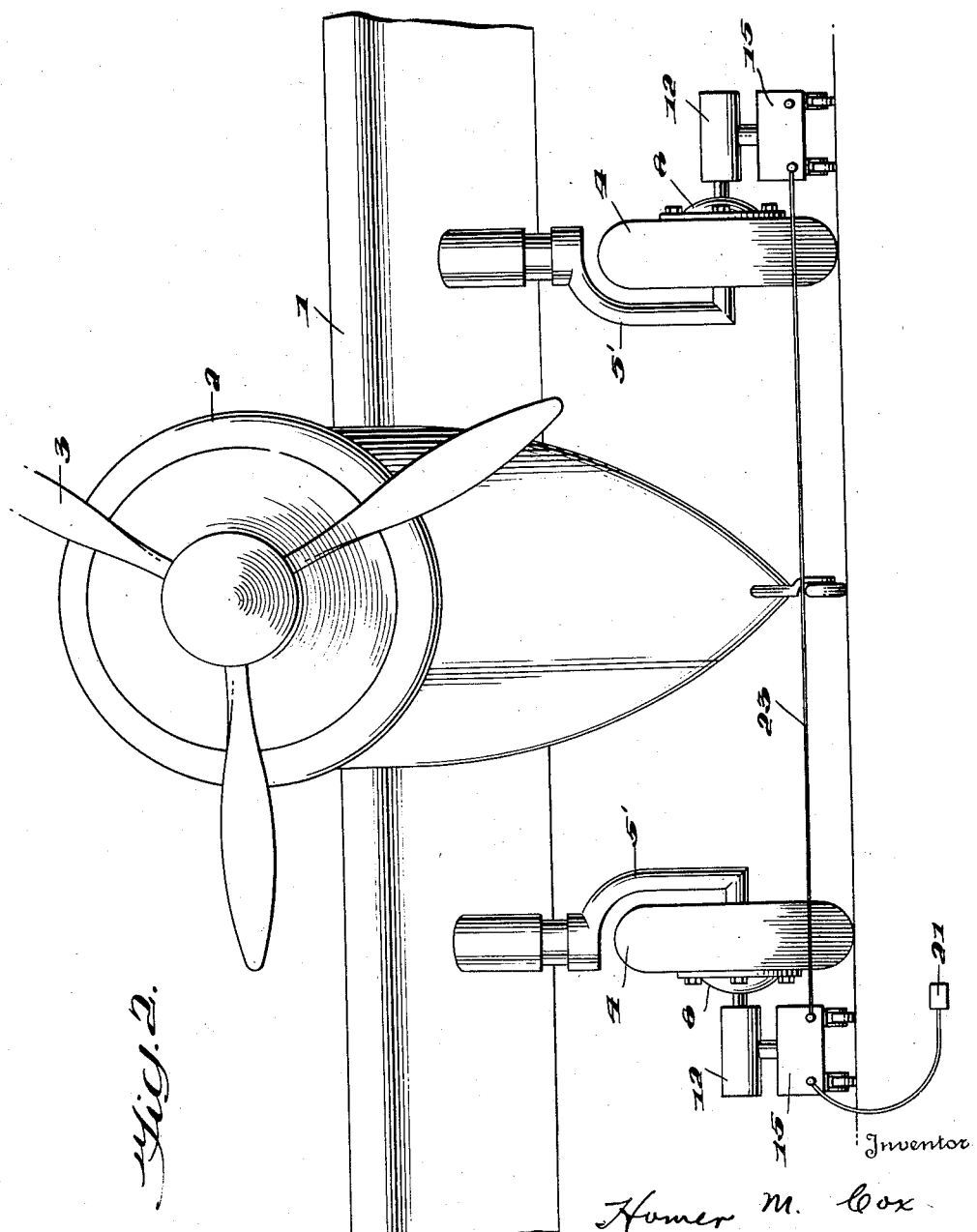

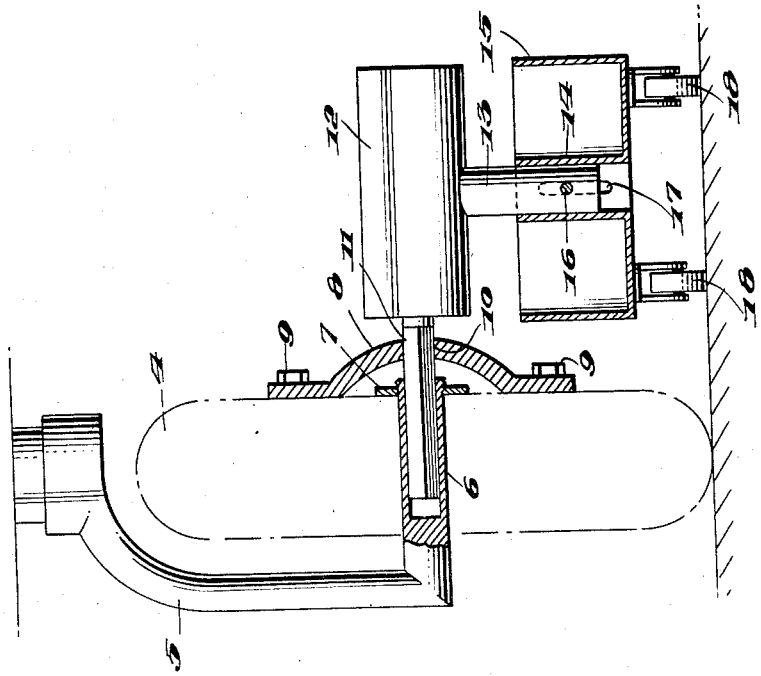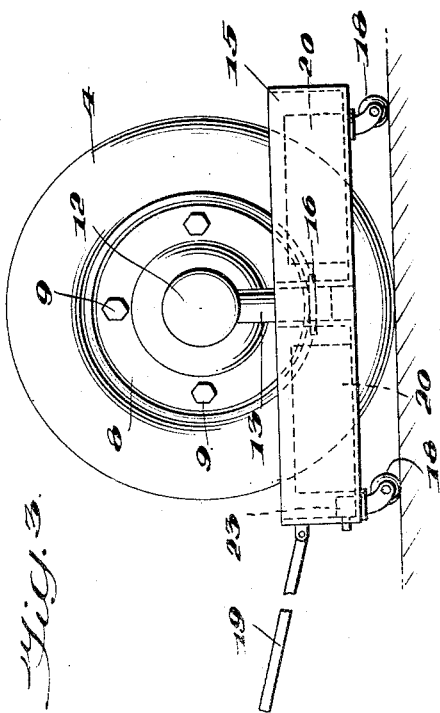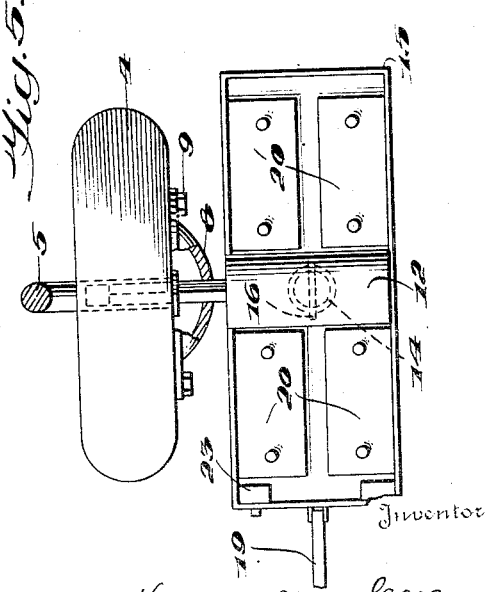

Patented Jan. 23, 1951

2,539,010

UNITED STATES PATENT OFFICE 2,539,010

AIRCRAFT PROPELLING DEVICE

Homer M. Cox, Phoenix, Ariz.

Application July 9, 1946, Serial No. 682,437

14 Claims. (Cl. 244—50)

This invention relates to improvements in aircraft propelling devices adapted to move aircraft bodily on the ground without the use of the engine and propeller customarily employed heretofore for the purpose.

It has been the practice heretofore to move aircraft on the ground in the conventional taxiing manner by means of the power plant and propeller of the aircraft. However, there are many places where space does not permit the operation of the aircraft in this manner, such as the movement of airplanes into and out of hangars, the placement of airplanes on aircraft carrier flight decks, the movement to and from carrier elevators, and the handling within the hangar deck of a carrier, where space is very confined. For such purposes, it has been the custom heretofore to move the aircraft manually, but this is a burden and often requires several men for the purpose.

The object of this invention is to provide power means which may be connected with the aircraft to move the same about in such close places as mentioned above where space does not permit of the conventional taxiing by means of the aircraft power plant and propeller. This enables the aircraft to be moved about without the use of manpower for the purpose and without the operation of the usual power plant of the aircraft.

A further object of the invention is to simplify and improve the construction and operation of propelling devices for aircraft, particularly airplanes, to enable such propelling devices to be attached readily to the aircraft for the purpose of moving the same about in close places without the operation of the power plant and propeller of the aircraft, and under the control of a single operator who can so regulate and direct the movement of the aircraft that it may be placed in any desired position, especially in a confined place.

In the preferred embodiment of this invention, a cart is provided with a power unit adapted to be connected with one or more of the wheels of the aircraft for the purpose of operating the wheel or wheels to move the aircraft to the desired position. A cart may be provided for each of the main ground-engaging wheels of an airplane, capable of readily engaging or disengaging the respective wheels, and having means of control by an operator so that he may regulate the operation of the power plants to cause a propelling movement of the respective wheels as desired. Where electric motors are used in the respective power units, as is possible in most instances, the operator can control the supply of current to the respective motors and thereby regulate the operation of the respective wheels, thus directing the movement of the aircraft to the desired position. It is also possible for the operator to ride in the cock-pit or to walk either at the front or at the rear or at either side of the aircraft, thereby enabling him to direct its movement to the point desired while having full vision around the aircraft and enabling him to miss all obstacles.

This embodiment of the invention is illustrated in the accompanying drawings, in which:

Fig. 1 is a front elevation of an aircraft showing the propelling devices applied thereto at points between the wheels;

Fig. 2 is a similar view with the propelling devices applied externally of the wheels;

Fig. 3 is a side elevation of the propelling devices applied to a wheel;

Fig. 4 is a partial cross section therethrough, with parts in elevation; and

Fig. 5 is a top plan view thereof with parts broken away and in section.

The invention is shown as applied to an airplane designated generaly by the numeral 1, and having a main power plant 2 for the operation of the usual propeller 3, shown as mounted at the front of the airplane. It will be understood, however, that the invention may be used for any type of aircraft, although it finds ready application to the maneuvering of airplanes into and out of hangars and about aircraft carriers and in other close quarters where space does not permit the taxiing of the airplane by the operation of its power plant 2 and propeller 3, in the usual way.

The airplane 1 which is supported on the usual main ground-engaging wheels 4, have upstanding struts 5 extending therefrom to support the fuselage and wings of the airplane on the wheels 4. In some instances, the struts 5 are disposed outside the wheels 4, as shown in Fig. 1, and in other constructions these struts extend inside the wheels, as indicated at 5' in Fig. 2. This invention is capable of use with either type of construction as is respectively indicated in the drawings.

Each of the wheels 4 is mounted on a journal 6 fixed to the lower end of the strut 5 and journaled thereon for rotation in the usual manner. The wheel is confined on the journal 6, by a nut 7 (Fig. 4).

Attached to each of the wheels 4 is a driving plate 8 shown as secured to the wheels by screws or bolts 9, on the side thereof opposite from the strut 5. This driving plate 8 has an opening 10 therethrough that is preferably square, or of other polygonal shape, to have a driving connection with a drive shaft 11 that extends through the opening in a close fit therewith and loosely into the journal 6.

The drive shaft 11 is connected with a power unit 12 that may comprise an electric motor of relatively slow driving speed or a motor and gear reducer of the usual character which is well-known and need not be illustrated in detail.

The power unit 12 is shown as supported by means of a standard 13 telescoped in a guide sleeve 14, provided in the center of a cart generally indicated at 15. The standard 13 is free to move up and down in the sleeve 14 to enable the driving shaft 11 to be raised to the proper height for clutch engagement with the plate 8 or to be lowered to the top of the cart when the latter is disconnected from the aircraft. A pin 16 extends through the pedestal 13 and through slots 17 in opposite sides of the sleeve 14, both to prevent the accidental separation of the power unit 12 from the cart 15, and also to insure the movement of the cart in the same direction as the airplane to which it is connected.

The cart 15 is shown as mounted on a plurality of ground-engaging wheels 18, having swiveled connection with the cart, and free to turn to follow the direction of travel of the aircraft. The cart 15 may be provided also with a handle as indicated at 19 in Figs. 3 and 4, if desired, to facilitate the manual movement of the cart to a proper position relative to the airplane wheel or for movement of the cart when not in use.

Where the power unit 12 includes an electric motor, the cart 15 preferably includes also a source of electric current therefor, such as storage batteries 20 mounted in the cart and having electrical connection with the motor. This connection may be under the control of the operator through a hand switch device designated 21 in Figs. 1 and 2, which will enable the operator to control the movement of the cart and, therefore, the movement of the airplane to the desired position.

As shown in Figs. 1 and 2, a separate cart and power unit may be provided for the respective wheels of an airplane, having driving connections with the driving plates thereof. These respective carts may be connected together through an electric cable 22 which extends from a supply reel or ratchet drum indicated at 23 in Figs. 3 and 5, which allows an extension of the electric cord 22 to the required extent but takes up the slack in the cord. A similar ratchet drum or reel may be provided for the electric connection to the control unit 21, if desired. Through such electric connections, it is possible for the operator to control simultaneously the movement of two or more power units either to operate these uniformly in moving the aircraft in a straight line direction or for relative movement of the respective power units, so as to move one wheel faster than the other and thereby turn the aircraft as may be desired.

It will be evident that the propelling device may be attached to the airplane wheels merely by moving the respective carts 15 to positions opposite from the struts thereof, lifting the power unit 12 to the proper height and engaging the drive shaft 11, in clutch engagement with the opening 10 in the driving plate 8 of the wheel. The cart and its power plant is then in driving engagement with the corresponding wheel ready to propel the latter upon operation of the power unit 12. By connecting the respective power units together, both of these may be operated simultaneously under the control of the operator to cause propelling movement of the wheels 4, along the ground, thus moving the airplane to the desired point. The carts are capable of engagement at points either between the wheels 4, as shown in Fig. 2, or on the outside of the wheels, as shown in Fig. 1, thus being adaptable for different types of airplane constructions and mountings of the wheels, as well as being variable for different widths of landing gear, and also for different diameters of wheels.

The propelling device enables the operator to move the aircraft about on the ground without the operation of the airplane power plant and propeller, especially in confined space where the operation of the propeller would not be practical. This is provided by a direct driving connection with the respective wheels for the operation of these without requiring man-power to move the aircraft from place to place.

The power units, indicated at 12 in Figs. 1 and 2, are preferably reversible, which permits the operator to maneuver the airplane in a backward direction with the same degree of accuracy and control as in the forward direction. This is accomplished by using reversible electric motors with reverse electric switches incorporated in the operator's control box 21 in Figs. 1 and 2. This feature greatly enhances the adaptibility of this device, as it enables the operator to set the airplane in backward motion in order to back into hangars, parking areas and other close places, as desired.

The invention is illustrated in an embodiment thereof, as described above, but it will be understood that this is merely for purpose of illustration and that variations and changes may be made in the construction and operation thereof without departing from the invention, except as set forth specifically hereinafter in the claims.

I claim:

1. A propelling device for aircraft comprising a cart, a power unit mounted on the cart, and a drive shaft connected with the power unit and driven thereby and having a clutch device connected therewith constructed for direct operative detachable engagement with a hub of a wheel of the aircraft to rotate said wheel for propelling the aircraft.

2. A propelling device for aircraft comprising a wheeled cart adapted for movement on the ground, a power unit supported on the cart, and a drive shaft having operative connection with the power unit and driven thereby and having a clutch device connected therewith constructed for directly engaging a hub of a wheel of the aircraft to rotate said wheel and propel the aircraft.

3. A propelling device for wheeled aircraft comprising a wheeled cart adapted to be mounted on the ground, a power unit carried by the cart, and a drive shaft operatively connected with said power unit and driven thereby, said drive shaft including detachable means for direct operative engagement with a hub of a wheel of the aircraft for rotating said wheel to propel the aircraft.

4. A propelling device for an aircraft having ground-engaging wheels, comprising a wheeled cart, a power unit mounted on the cart and including a driving motor, a drive shaft connected with the motor and driven thereby, said drive shaft having detachable means for direct clutch engagement with a hub of a wheel of the aircraft for rotating said wheel to propel the aircraft.

5. A propelling device for an aircraft having ground-engaging wheels, comprising a wheeled cart, a power unit mounted on the cart and including a driving motor, a drive shaft connected with the motor and driven thereby, said drive shaft having means for direct clutch engagement with a hub of a wheel of the aircraft for rotating said wheel to propel the aircraft, means mounting said power unit for up and down movement relative to the cart for adjustment to different heights, and means for preventing relative turning of the cart with respect to the drive shaft for guiding the cart in a direction parallel with the direction of movement of the wheel.

6. A propelling device for an aircraft having ground-engaging wheels, comprising a wheeled cart, a power unit mounted on the cart and including a driving motor, a drive shaft connected with the motor and driven thereby, said drive shaft having means for direct detachable clutch engagement with a hub of a wheel of the aircraft for rotating said wheel to propel the aircraft, a source of electric current mounted on the cart for supplying current to the electric motor, and electrical control means for controlling the operation of the electric motor.

7. The combination with an aircraft having a ground-engaging wheel having a hub, of a propelling device mounted for movement beside the wheel and including a power unit having operative driving connection with the hub of the wheel for propelling the wheel to move the aircraft.

8. The combination with an aircraft having a ground-engaging wheel, a hub plate on said wheel, of a propelling device including a wheeled support and a power unit, said power unit having detachable clutch engagement with the hub plate for rotating said wheel to propel the aircraft.

9. The combination with an aircraft having a ground-engaging wheel, a hub plate on said wheel, of a propelling device including a wheeled cart, and a power unit thereon, said power unit having a drive shaft in clutch engagement with the hub plate for rotating the wheel to propel the aircraft.

10. The combination with an aircraft having a ground-engaging wheel, of a propelling device including a wheeled cart, an auxiliary power unit thereon, said power unit having a drive shaft affixed thereto, and a driving plate fixed to the wheel, said drive shaft being telescoped into the driving plate in clutch engagement for rotating the wheel to propel the aircraft.

11. The combination with an aircraft having a pair of spaced ground-engaging wheels, each of said wheels having a driving plate fixed thereto with a socket in said plate, of propelling means for the aircraft comprising a wheeled cart beside each of the wheels, each cart including an auxiliary power unit and an external drive shaft, said drive shaft being detachably engaged in the socket and having clutch engagement therewith for rotating the wheel to propel the aircraft.

12. The combination with an aircraft having a pair of spaced ground-engaging wheels, each of said wheels having a driving plate fixed thereto with a socket in said plate, of propelling means for the aircraft comprising a wheeled cart beside each of the wheels, each cart including an auxiliary power unit and an external drive shaft, said drive shaft being detachably engaged in the socket and having clutch engagement therewith for rotating the wheel to propel the aircraft, means operatively connecting the power units together, and means for controlling the power units to synchronize the operation thereof.

13. A propelling device for an aircraft having clutch engaging wheels, comprising a wheeled cart, a power unit mounted on the cart and above the cart and including a driving motor, a drive shaft connected with the motor and driven thereby, said drive shaft having means for direct clutch engagement with a hub of a wheel of the aircraft for rotating said wheel to propel the aircraft, and means mounting said power unit for up and down movement relative to the cart for adjustment of the drive shaft to different heights.

14. A propelling device for an aircraft having clutch engaging wheels, comprising a wheeled cart, a power unit mounted on the cart and including a driving motor, a drive shaft connected with the motor and driven thereby, said drive shaft having means for direct clutch engagement with a hub of a wheel of the aircraft for rotating said wheel to propel the aircraft, and means mounted entirely on the cart for preventing relative turning thereof with respect to the drive shaft for guiding the cart in a direction parallel with the direction of movement of the wheel.

HOMER M. COX.

REFERENCES CITED

The following references are of record in the file of this patent:

UNITED STATES PATENTS

| Number | Name | Date |
|---|---|---|
| 627,066 | Schnepf | June 13, 1899 |
| 770,936 | Simpson | Sept. 27, 1904 |
| 1,285,343 | Olson | Nov. 19, 1918 |
| 1,313,693 | Hucks | Aug. 19, 1919 |
| 1,348,568 | Kemble | Aug. 3, 1920 |
| 2,172,126 | Lansing | Sept. 5, 1939 |
| 2,376,621 | Reed | May 22, 1945 |
| 2,409,552 | Donnellan | Oct. 15, 1946 |
| 2,414,859 | Demaline | Jan. 28, 1947 |